United States Patent [19]
Culverhouse et al.

[11] Patent Number: 5,383,207
[45] Date of Patent: Jan. 17, 1995

[54] OPTICAL CARRIER GENERATION USING STIMULATED BRILLOUIN SCATTERING

[75] Inventors: David Culverhouse; Faramarz Farahi; David A. Jackson, all of Canterbury; Christopher N. Pannell, Totton; Ralph P. Tatam, Grendon, all of England

[73] Assignee: British Technology Group Limited, London, England

[21] Appl. No.: 778,923

[22] PCT Filed: Jun. 29, 1990

[86] PCT No.: PCT/GB90/01008
§ 371 Date: Dec. 12, 1991
§ 102(e) Date: Dec. 12, 1991

[87] PCT Pub. No.: WO91/00632
PCT Pub. Date: Jan. 10, 1991

[30] Foreign Application Priority Data

Jun. 29, 1989 [GB] United Kingdom ......... 8914988
Nov. 24, 1989 [GB] United Kingdom ......... 8926607

[51] Int. Cl.6 ........................ H01S 3/30; G01B 9/02
[52] U.S. Cl. .................................... 372/28; 356/43
[58] Field of Search ................. 372/28, 26; 356/43

[56] References Cited

U.S. PATENT DOCUMENTS 4,159,178  6/1979  Vali et al. ............... 356/350
5,009,500  4/1991  Leonard et al. .......... 356/43
5,110,217  5/1992  Sweeney ................... 356/43

FOREIGN PATENT DOCUMENTS 0213872  3/1987  European Pat. Off. .
0257959  3/1988  European Pat. Off. .
0300529  1/1989  European Pat. Off. .
2183821  6/1987  United Kingdom .

OTHER PUBLICATIONS

Culverhouse et al, "Stimulated Brillouin Scattering: A means to realise tunable microwave generator or distributed temperature sensor", Electronics Letters, vol. 25, No. 14, Jul. 1989, pp. 915–916.
Culverhouse et al, "Potential of stimulated Brillouin scattering as sensing mechanism for distributed temperature sensors", vol. 25, No. 14, Jul. 1989, pp. 913–915.
Patent Abstracts of Japan, vol. 11, No. 264, (p. 610) Aug. 1987.
Kersey et al, "Linearised polarimetric optical fibre sensor using a 'heterodyne-type' signal recovery scheme", Electronics Letters, vol. 20, No. 5, Mar. 1984, pp. 209–211.

Primary Examiner—James W. Davie
Attorney, Agent, or Firm—Cushman, Darby & Cushman

[57] ABSTRACT

Apparatus for producing signal frequency shifts by stimulated Brillouin scattering comprises a pair of optical fibres (112,113) or a single high birefringence fibre which are illuminated by a laser beam to generate two back-scattered signals by stimulated Brillouin scattering and a mixer (117) to combine the two back-scattered signals to produce a beat frequency from the combined signals.

21 Claims, 14 Drawing Sheets

OPTICAL CARRIER GENERATION USING STIMULATED BRILLOUIN SCATTERING

This invention relates to arrangements for producing and detecting signal frequency shifts produced by stimulated Brillouin scattering (SBS), and more particularly to such arrangements which may have practical applications in for example distributed temperature sensing.

It is proposed herein to utilise stimulated Brillouin scattering as a sensing mechanism for distributed temperature sensors in which a laser beam is directed into an optical fibre, acting as a remote temperature sensing element, to generate a back-scattered SBS signal. In principle the temperature of the remote sensing element can be determined from the frequency shift $v_B$ of the back-scattered Brillouin line where:

$$v_B = \frac{2n\, V_A \sin\tfrac{1}{2}\theta}{\lambda}$$

where n is the refractive index, $V_A$ the hypersonic velocity, $\lambda$ the wavelength of the incident beam and $\theta$ the scattering angle = 180° for full back-scattering.

In a typical monomode optical fibre, $v_B = 30$ GHz and $dv_B/dT = 5.5$ MHz/°C, hence optical resolutions of 5 MHz are required for a 1° C. temperature resolution in a distributed temperature sensor. Although resolutions of this order of magnitude are achievable with high contrast confocal scanning Fabry-Perot interferometers, absolute optical frequency measurements with this degree of accuracy are difficult to achieve over protracted periods.

An alternative approach for signal recovery commonly used in light scattering experiments, particularly where the line width of the scattered light is narrow, is optical heterodyning where the scattered light signal is mixed with the unshifted input laser beam. Light scattered from spontaneous propagating density fluctuations in the medium will be incoherent and the line width of the heterodyne signal will be broadened by the dissipative mechanisms in the medium (hypersonic attenuation in the case of the Brillouin scattering). On the other hand, SBS is a coherent process such that the backscattered light is only subject to random phase fluctuations. Thus if this signal is heterodyned with the input laser beam the observed line width should be extremely narrow.

In principle this heterdyned signal at about 30 GHz could be directly observed using a photodiode with a frequency response in excess of 30 GHz, together with a very high frequency microwave spectrum analyser. However, such a solution would be extremely expensive, thus effectively eliminating this approach for distributed temperature sensing.

It is therefore an object of the present invention to provide an arrangement for detecting signal frequency shifts produced by SBS, which is more effective and relatively inexpensive so that it may be used in practical applications such as distributed temperature sensing.

According to the present invention there is provided an arrangement for producing signal frequency shifts by stimulated Brillouin scattering characterised in that it comprises optical fibre means adapted to be illuminated by a laser beam so as to generate two back-scattered signals by stimulated Brillouin scattering and means for combining the two back-scattered signals to product a beat frequency from the combined signals.

As the frequency shifts of the back-scattered signals vary with temperature, the beat frequency, which occurs at a considerably lower frequency than that of the back-scattered signals, will likewise be temperature-variable.

In one embodiment of the invention, the arrangement is adapted for use as a distributed temperature sensor. To this end, the optical fibre means preferably consists of two separate optical fibres, one of which is maintained at a reference temperature and the other of which is used as a distributed temperature sensing element. The laser source may comprise a single frequency pulsed laser diode for simultaneously illuminating the two optical fibres. The back-scattered signals generated within the two optical fibres are combined and the resultant optical beat frequency signal, which is indicative of the differential temperature of the two fibres, is detected by a photodetector. The arrangement also preferably includes means for processing the detected beat frequency to generate temperature output data.

In another embodiment of the invention, the arrangement is adapted for use as a tunable microwave generator. In one configuration the optical fibre means consists of two separate optical fibre ring resonators, which may be simultaneously illuminated by a single frequency continuous wave laser diode. The two back-scattered signals produced by the ring resonators are combined and the resultant optical heat frequency signal is detected by a photodetector. The arrangement also includes means for converting the detected optical beat frequency signal into electrical microwave signals. The beat frequency may be variable by adjusting the temperature and/or fibre properties of each resonator so as to provide a microwave generator which is tunable.

In an alternative configuration of the microwave generator, the optical fibre means comprises a single optical fibre ring resonator fabricated with very highly birefringent fibre, the ring being illuminated such as to populate both eigenmodes of the ring fibre at a power level sufficient to generate two orthogonally polarised back-scattered signals from the eigenmodes.

In order that the invention can be more readily understood, reference will be made to the accompanying drawings, in which.

Referring firstly to FIGS. 1 to 4, the experimental arrangement shown was used to test the feasibility of generating an optical heterodyne or beat carrier from two back-scattered signals produced in separate optical fibres by Stimulated Brillouin Scattering (SBS).

Figure 1:
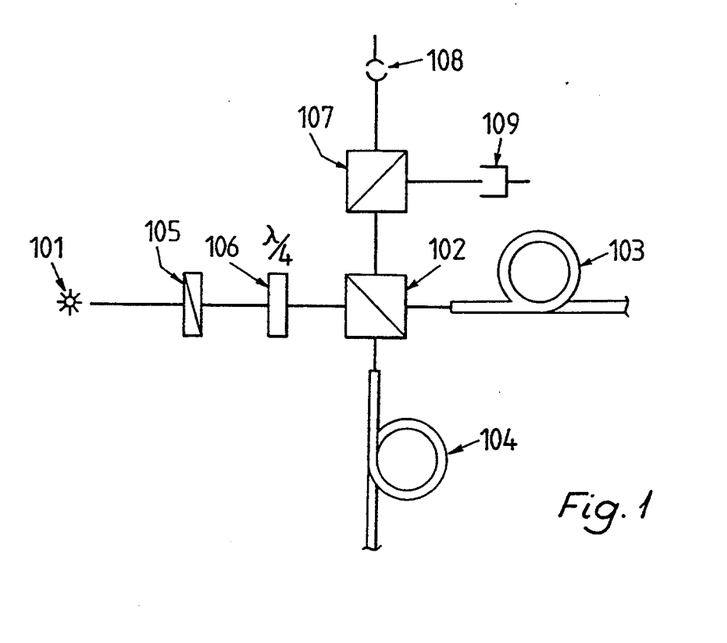
FIG. 1 illustrates schematically an experimental arrangement, in accordance with one embodiment of the present invention.

Light from a single frequency argon ion laser (101) operating at 514.5 nm was launched, via a beam splitter (102), into two 500 m lengths of monomode optical fibre (103) and (104) of slightly different compositions. An optical isolator comprising a Glan Thompson prism (105) and a quarter wave plate (106) was used to prevent any instabilities in the laser output frequency being caused by back-scattered light entering the laser cavity. The back-scattered SBS signals from both fibres, (103,104) were combined on the beam splitter (102) and intensity divided at another beam splitter (107) to enable the optical and heterodyne spectra of the light to be simultaneously measured using a high resolution confocal Fabry-Perot (CFP) (108) and an electronic spectrum analyser (not shown).

Figure 2:
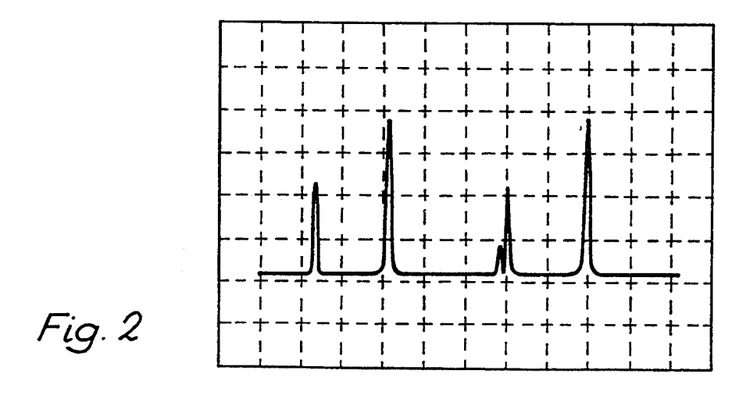
FIGS. 2 to 4 show traces illustrating the experimental results produced with the arrangement shown in FIG. 1.

FIG. 2 shows the optical spectrum of the light analysed with a CFP with 2 GHz free spectral range scanned over two orders whilst both fibres were maintained at room temperature. The frequency shifts of the two stimulated Brillouin lines relative to the input laser pump line are 32.042 GHz and 32.796 GHz. This frequency different of 745 MHz may be attributed to the different dopant levels in the fibres.

Figure 3:
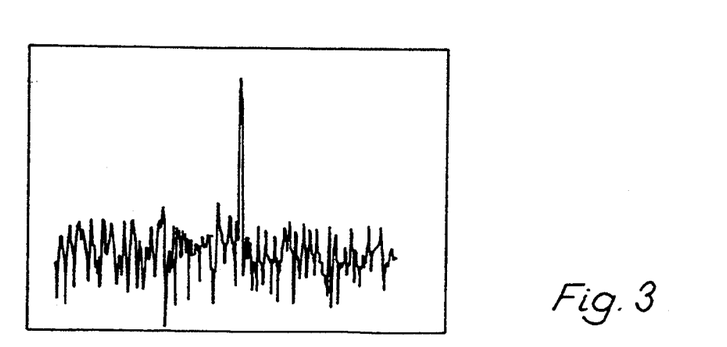

The two back-scattered SBS signals were also detected on a high-speed PIN photodiode (109), and the spectrum of its output current was anlaysed with an HP8590A R.F. spectrum analyser (not shown). FIG. 3 shows the resulting power spectrum (the fibres being maintained under the same conditions as previously), where a very strong <1 MHz wide peak at 760 MHz is easily identified. The frequency of this peak clearly corresponds to the difference frequency between the two SBS signals so that it may be concluded that optical heterodyning is occurring.

The narrow line width of the heterodyne or beat frequency signal also confirms that although the scattering is occurring in different fibres a considerable degree of temporal coherence between the stimulated signals must be retained.

Figure 4:
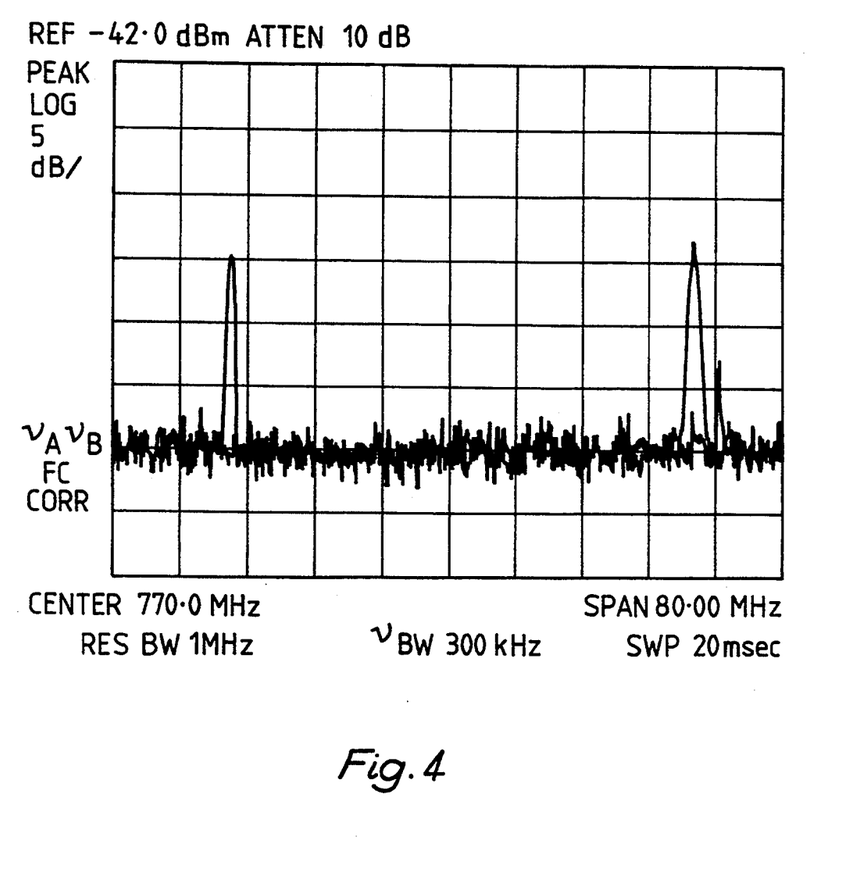

A further experiment was performed in which the beat frequency was monitored whilst the temperature of one of the fibres was lowered, the temperature of the other fibre being held constant. The results of this experiment are shown in FIG. 4 where two traces are superimposed. The low frequency peak (748 MHz) corresponds to the beat frequency when both fibres where at the same temperature and the high frequency peak at about 800 MHz when the differential temperature is 10° C. This corresponds to a frequency shift of about 5.2 MHz°C.$^{-1}$ and is in agreement with the temperature sensitivity referred to above.

These experimental results thus verify that a strong heterodyne or beat signal with a narrow linewidth can be produced by mixing two SBS signals generated in separate optical fibres. The beat frequency is shown to vary rapidly with temperature and it also depends on the physical properties of the fibre.

The inventors have thus concluded that the present invention can be exploited in practical applications to realise for example a high resolution distributed temperature sensor or a tunable microwave generator with a large frequency range.

Figure 5:
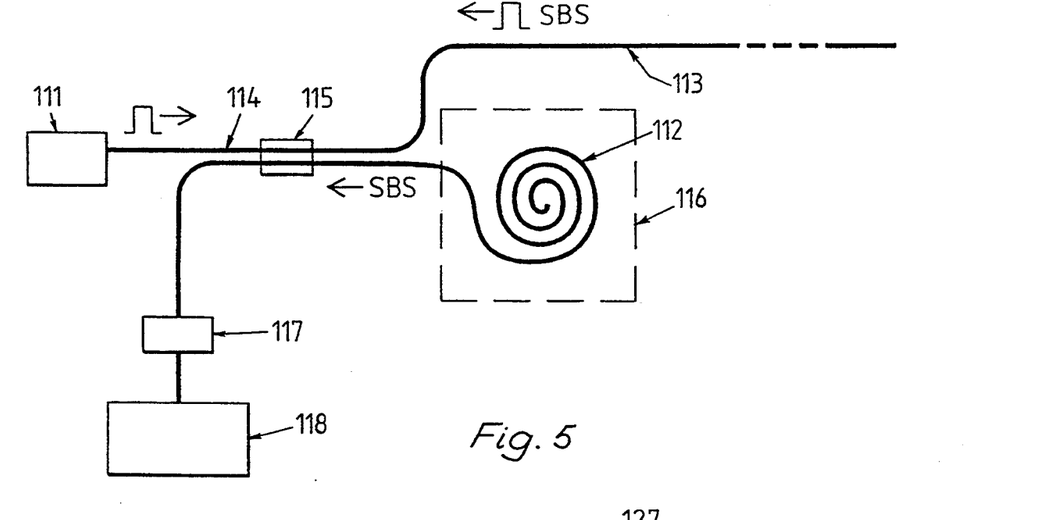
FIG. 5 illustrates schematically a practical arrangement, in accordance with another embodiment of the present invention, suitable for use as a distributed temperature sensor.

To this end, one practical arrangement suitable for use as a distributed temperature sensor is illustrated in FIG. 5. In this arrangement, a pulsed laser diode (111) of single frequency typically at 1.3 μm, simultaneously illuminates two monomode optical fibres (112) and (113), which are also adapted to operate at 1.3 μm, by means of an optical fibre (114) and a directional coupler (115). One optical fibre (112) is placed within an environmental chamber (116) to enable the fibre (112) to be maintained at a constant reference temperature. The other optical fibre (113) is deployed as a remote temperature sensing element. Backscattered SBS signals generated in each of the fibres, (112) and (113), are combined and the resultant beat frequency of the combined signal is detected by a photodetector (117). The beat frequency signals are then processed by a signal processor (118).

SBS can be generated in a long fibres with input powers of only a few milliwatts. If for example, a pulse of width $20 \times 10^{-9}$ s is used then the spatial resolution will be of the order of 2 m. Using the known technique of range gating, any specific section of the fibre and equivalent region in the reference fibre can be located. The differential beat frequency produced by combining the SBS signals generated at the reference and sensor fibres location will be directly related to the differential temperature of the reference and sensor fibres. This signal only exists for $20 \times 10^{-9}$ s (assuming we are operating with a spatial resolution of 2 m). It is therefore necessary to use as the signal processor 18 a special high bandwidth multichannel device to measure this signal. This may be achieved either directly in the frequency domain using an optical spectrum analyser based upon a Bragg cell which is capable of simultaneously resolving 100 separate frequencies, or alternatively in the time domain using a very high speed digital correlator.

Figure 6:
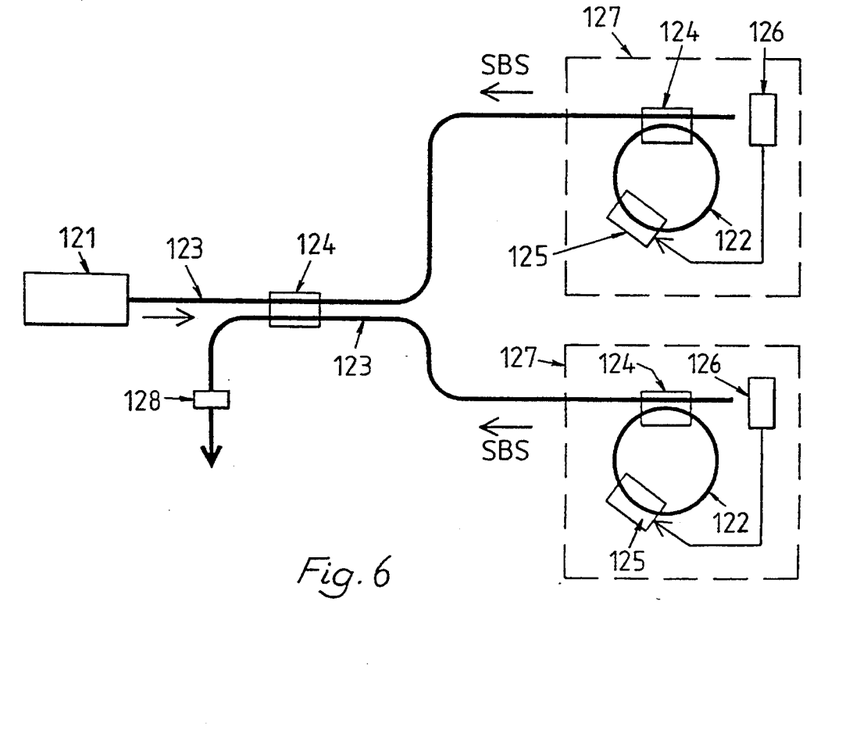
FIG. 6 illustrates schematically a practical arrangement, in accordance with yet another embodiment of the present invention, suitable for use as a tunable microwave generator.

Another practical arrangement suitable for use as a tunable microwave generator is illustrated in FIG. 6. In this arrangement, a single frequency, continuous wave laser diode (121) simultaneously illuminates two high finesse optical fibre ring resonators (122) by means of two monomode optical fibres (123) and directional couplers (124). Each ring resonator (122) has a piezo-electric phase modulator (125) and a photodetector (126) used to monitor the output of the ring (122) and to send error correction signals to the phase modulator (125). The ring resonators (122) are each placed in an environmental enclosure (127) so that the temperature of each ring can be individually varied. With optical input powers of less than 100 μW, each ring produces at resonance a back-scattered SBS signal at a frequency dependent on the fibre properties and the temperature of each fibre. The two SBS signals are combined on the surface of a photodetector (128) and the resultant beat frequency, which occurs at the differential frequency of the two SBS signals, is converted by the photodetector into an electrical microwave signal. Thus, by varying the fibre properties and temperatures of the ring resonators, a wide range of beat frequencies and thus microwave frequencies can be achieved, thereby producing a tunable microwave generator.

A lower frequency signal may be generated by an alternative configuration (not shown) based upon a single ring resonator fabricated with very highly birefringent fibre. The ring is illuminated such as to populate both eigenmodes of the fibre constituting the ring at a power level sufficient to product SBS signals from each eigenmode so that two orthogonally polarised SBS signals are generated. These two signals are then combined via a polariser set with its transmission axes at ±45° to the eigenaxes of the fibre. The optical beat signal produced is then detected with a pin diode and converted to an electrical microwave signal. The beat signal varies at a frequency equal to the different frequency of the two separate SBS signals generated in the ring. This frequency will be in the range 0-100 MHz and is again dependent on the fibre properties and the ring temperature which can be varied to provide a tunable microwave generator.

Within the field of optical fibre sensor technology there is a fundamental requirement to obtain a heterodyne optical carrier at a frequency suitable for subsequent electronic signal processing. A heterodyne optical carrier of frequency $\Delta v$ is produced by mixing together two coherent optical signals, one at frequency $v$ and the other at frequency $v'\Delta v$.

It is known to construct frequency shifters based on linearly birefringent optical fibre. However, all these devices are based on mechanically coupling a travelling acoustic wave on to the optical fibre causing an exchange of power between the two eigenmodes and a resulting shift in frequency. The travelling acoustic waves are induced by a piezo-electric modulator. Such devices are difficult to fabricate, require several watts of electrical input power, have a low optical conversion efficiency, and are not mechanically rugged.

We have devised an optical frequency shifter that is passive in operation because it does not require any external electrical power to provide the frequency shift, it is simple to fabricate and relatively simple to construct as a rugged practical device. The frequency of the heterodyne optical carrier obtainable with commercially available optical fibre and laser sources is approximately DC to 20 MHz. This frequency is in a suitable range to produce optical heterodyne carriers for signal processing applications in optical sensor and communication systems.

Referring to FIGS. 7 to 17 of the drawings, light is coupled from a laser to lasers (1) via a beamsplitting arrangement (3) and focusing optics (4) into birefringent optical fibre (2) such that both eigenmodes of the optical fibre are equally populated. The birefringent fibre (2) may have linear, circular or elliptical eigenmodes. Stimulated Brillouin scattering takes place within the optical fibre due to scattering from pressure (sound) waves which are caused by electrostriction. This causes some of the light to propagate back along its original path in the optical fibre and exits from the entrance face (10). This light is then separated from the input light using the beamsplitting arrangement (3).

The light in each polarisation eigenmode of the optical fibre due to the SBS process exhibits a shift in its frequency by an amount given by $$v_{Bi} = \frac{2V_A \, n_j}{\lambda_i} \quad (\lambda_i, T); \, j = f, s \qquad 1$$

where $v_{Bi}$ is the Brillouin frequency, equal to approximately 34 GHz in a silica fibre at a source wavelength, $\lambda_i$, of 514.5 nm, $V_A$ is the acoustic velocity and $n_j$ is the refractive index of the fast or slow polarisation eigenmodes of the fibre. The difference in the frequency of the light is $$v_{Bf} - v_{Bs} = \frac{2V_A}{\lambda_i} (n_f - n_s) \qquad 2$$

where $v_{Bf}, v_{Bs}$ are the stimulated Brillouin frequency shifts associated with the fast and slow polarisation eigenmodes respectively. For example, for a birefringent fibre with $(n_f - n_s) = 10^{-3}$ and $\lambda_i = 514.5$ nm the beat frequency is approximately 17.5 MHz.

Figure 14:
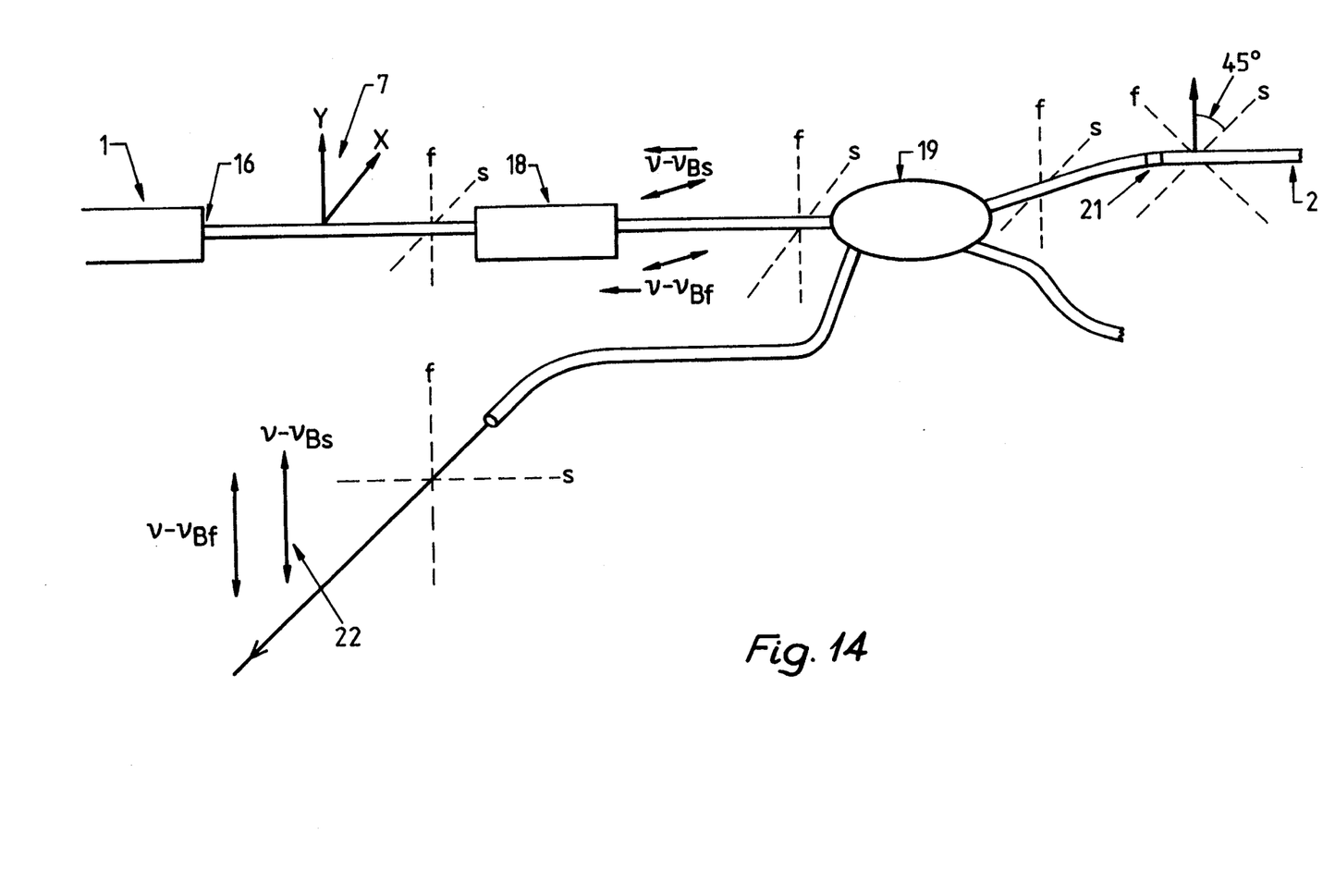

Consider first, linearly birefringent optical fibre (FIG. 14). In this configuration a linear or elliptical state of polarisation with an azimuth at 45° to the co-ordinate system must be used to equally populate the two orthogonal linear polarisation eigenmodes of the fibre or alternatively, a circular state of polarisation may be used. On exiting the fibre (10) the light from the two linear polarisation eigenmodes (11) have orthogonal linear states of polarisation which are of different frequencies (5), and are resolved using a linear analyser (6) orientated with its transmission axis at 45° to the x,y co-ordinate system (7); the fast axis of the fibre is aligned parallel to the x and y axis. If the threshold power level required for SBS is different for the two polarisation eigenmodes the relative power in each eigenmode is adjustable by rotating the azimuth of the input linear or elliptical state away from 45° thus causing unequal population of the two modes.

Figure 9:
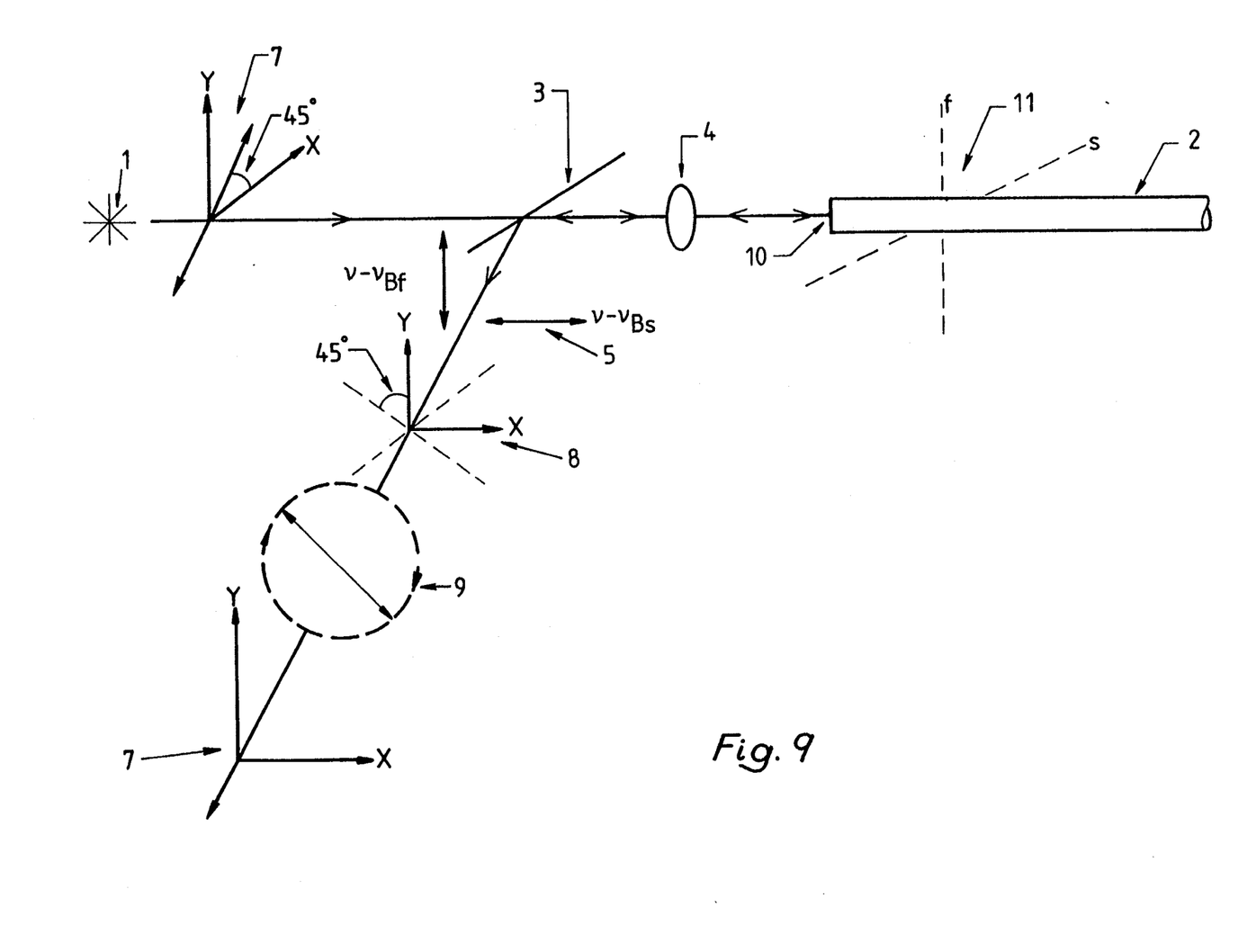

An alternative optical heterodyne carrier generation technique is shown in FIG. 9. The linear polariser (5) is replaced by a quarter wave plate (8) oriented with its fast axis at 45° to the co-ordinate system (7). On transmission through the quarter wave plate the two orthogonal linear states of polarisation are converted to two orthogonal circular states of polarisation which combine to produce a linear state of polarisation with an azimuth rotating at constant angular velocity. The angular velocity (9) is dependent on $(v_{Bf} - v_{Bs})$ such that for $(n_f - n_s)$ of $10^{-3}$ the angular velocity is $110 \times 10^6$ rads$^{-1}$. This rotating linear state of polarisation is used as a heterodyne optical carrier in many optical sensor applications, for example, Faraday rotation based electric current and magnetic field sensing.

Figure 10:
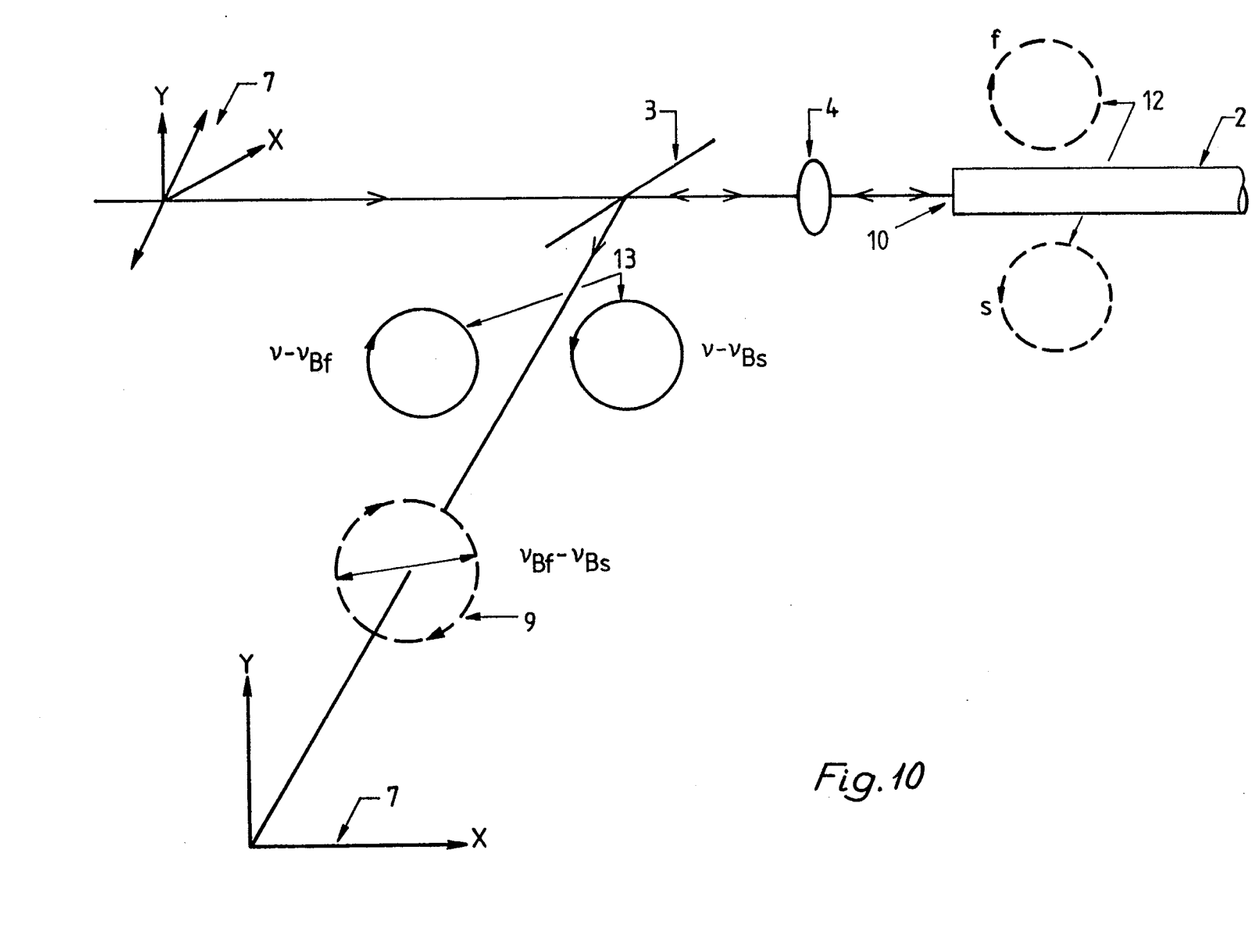

Consider secondly, circularly birefringent optical fibre (FIG. 10). In this configuration linearly polarised light from the source (7) is coupled into the optical fibre as previously described. For this configuration a linear state of polarisation at any azimuth to the co-ordinate system will equally populate the circular polarisation eigenmodes of the fibre (12). The light exiting from the fibre (10) has two orthogonal circular-states of polarisation of different frequencies (13) which combine to product a linear state of polarisation with an azimuth rotating a constant angular velocity. This technique is similar to one described above but offers reduced complexity because of the absence of a quarter waveplate.

Figure 11:
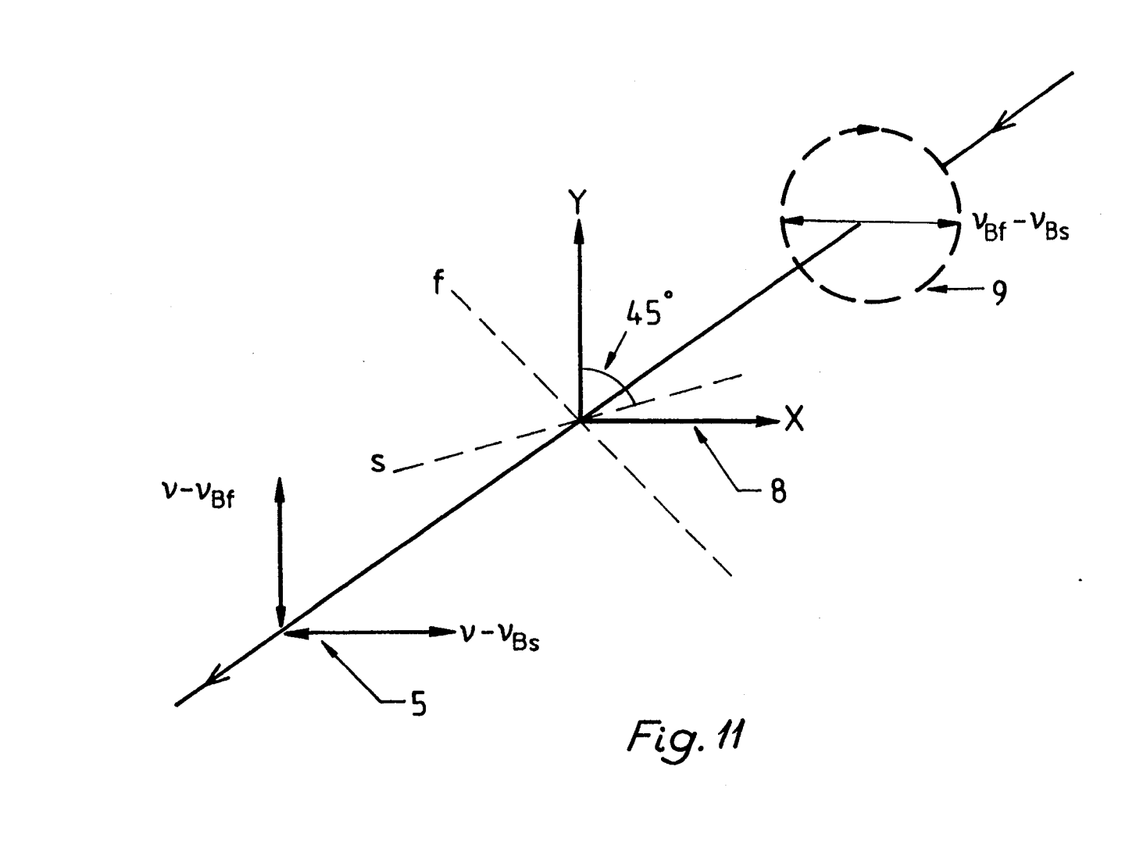

An alternative optical heterodyne carrier generation technique is shown in FIG. 11 where a quarter wave plate (8) is used to produce two orthogonal linear states of polarisation of fixed azimuth and different frequencies from the two orthogonal circular states of polarisation of different frequencies. It is also possible to use elliptically birefringent optical fibre with elliptical polarisation eigenmodes to produce an optical heterodyne carrier using techniques similar to those described in previous paragraphs.

Linearly birefringent fibre with a beat length of 1 mm to 2 mm is available commercially for the wavelength region 488 mm to 1.3 $\mu$m giving an optical carrier generated in the approximate frequency range 8 MHz to 18 MHz. With the introduction of optical fibres exhibiting larger birefringence ($\Delta n$) values the upper frequency range would be extended.

Circularly birefringent fibre is available commercially with $\Delta n = 3.2 \times 10^{-6}$ at 633 mm, 780 mm, and 820 mm giving an optical carrier generated at approximately 85 KHz.

For optical fibre that has zero birefringence in its unstressed state linear birefringence is controllably introduced by bending the fibre in a loop. The induced linear birefringence is given by:

$$\beta_b (\lambda_i, T) = \frac{K}{\lambda_i} (\lambda_i, T) \left( \frac{r^2}{R^2} \right) \text{rad m}^{-1} \qquad 3$$

where K ($\lambda_i$, T) is a combination of material properties, r is the radius of the fibre and R is the bend radius. Therefore the birefringence of the fibre may be controlled by the bend radius.

For example, for r=50 μm and $\lambda_i$=633 mm, K($\lambda_1$, 20° C.)=0.82 rad giving a birefringence value of $$\beta_b (\lambda_i, T) = 3.24 \times 10^{-3} \left( \frac{1}{R^2} \right) \text{rad m}^{-1} \qquad 4$$

Table 1 gives an example values of Δv calculated for various bend radii.

TABLE 1

| Values of R,$\beta_b$ and Δλ for $\lambda_i$ = 633 nm | | |
|---|---|---|
| R/m | $\beta_b$/radm$^{-1}$ | Δv/KHz |
| 3 × 10$^{-3}$ | 350 | 1011 |
| 5 × 10$^{-3}$ | 129.6 | 360 |
| 10$^{-2}$ | 32.4 | 91 |
| 2.4 × 10$^{-2}$ | 5.2 | 14.6 |
| 5 × 10$^{-2}$ | 1.3 | 3.6 |
| 0.1 | 0.3 | 0.9 |
| 0.15 | 0.14 | 0.4 |

The technique of bending the fibre in loop of radius R is therefore a technique that enables a range of frequencies to be produced in the range DC to approximately 1 MHz.

Figure 12:
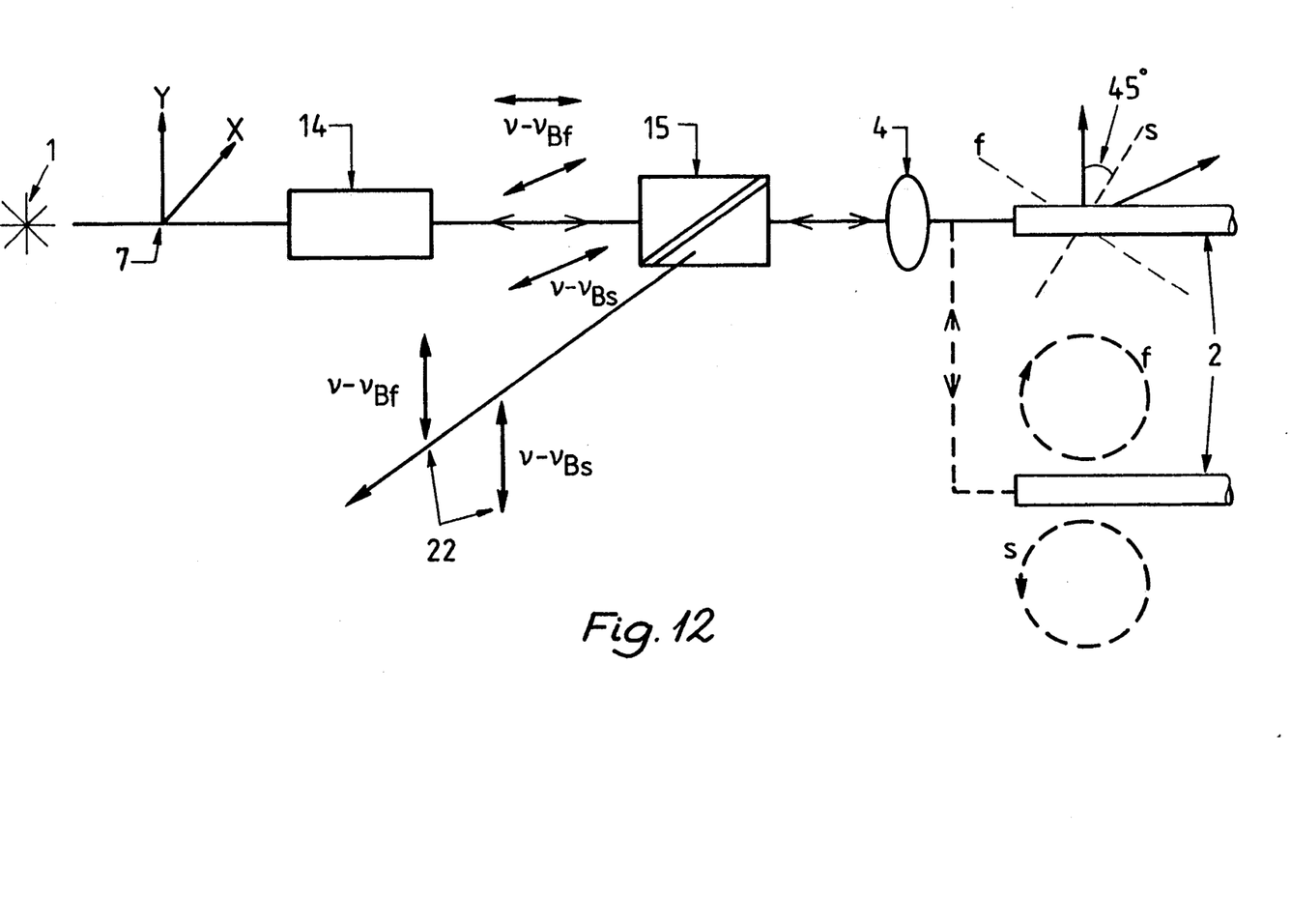
Figure 13:
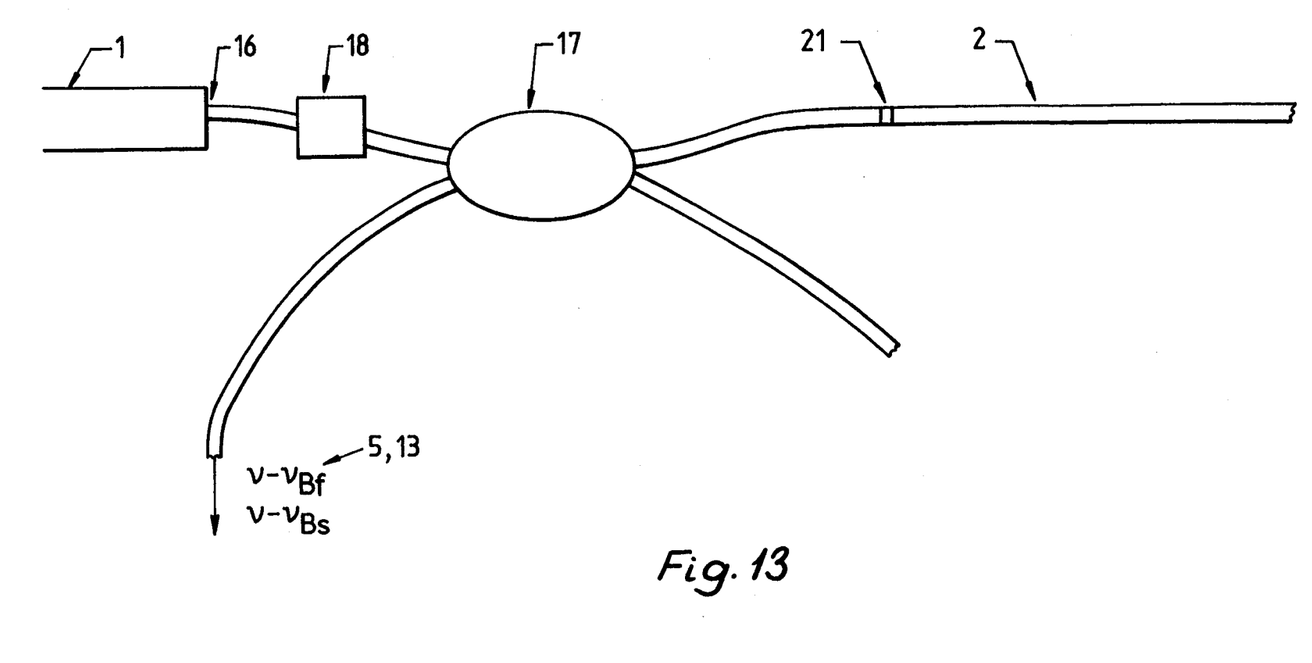
FIGS. 13-17 are schematic drawings of different practical embodiments.

Other configurations for coupling optical power from the source into the fibre and generating the optical heterodyne carrier are shown in FIGS. 12 and 13.

The source (1) can be isolated from all back reflections, thus increasing its linewidth and intensity stability, by insertion of a Faraday isolator (14) into the optical beam.

Figure 8:
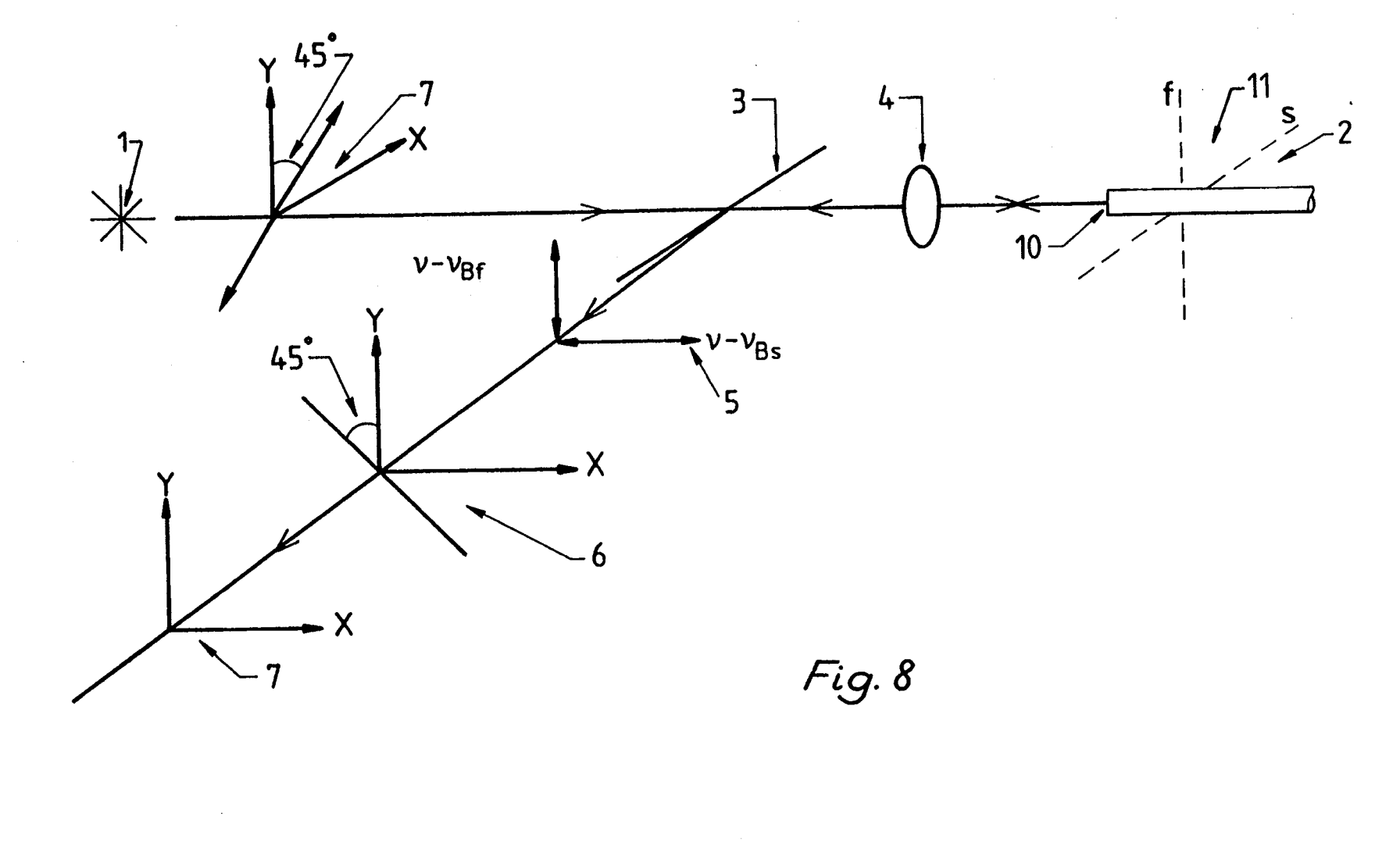

The linear analyser (6) of FIG. 8 and the quarter wave plate (8) of FIG. 11 may be replaced by substituting a polarising beamsplitter (15) for the beamsplitter (3). The polarising beamsplitter performs the function of recombination of the two orthogonal polarisation states output from the fibre thus producing an optical heterodyne carrier.

Figure 7:
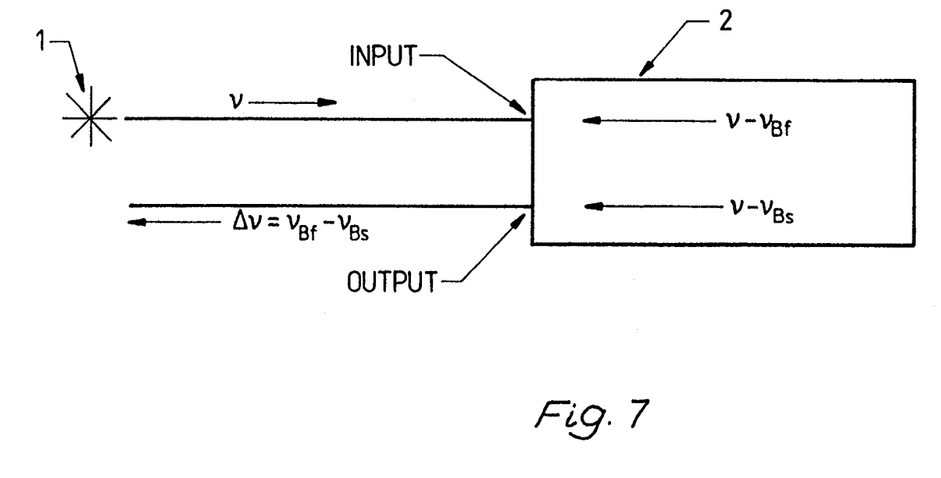
FIGS. 7-12 are schematic illustrations apparatus in accordance with different aspects of the invention.

For solid state sources, for example laser diodes, an optical fibre can be directly coupled to the output facet (pigtailing), FIG. 13, of the laser thus providing a permanent and stable connection. The previous beamsplitting arrangements (3), (15) are replaced by an optical fibre directional coupler (17) of which various types are available. FIG. 7 indicates the simplest configuration to construct. Light from the source (1) is coupled onto the fibre by the pigtail connection (16), passing through a fibre optical Faraday isolator (18) and power divided at the low birefringence directional coupler. Light exiting from the fibre is divided again at the directional coupler and the two orthogonal states of polarisation of frequencies $v-v_{Bf}$ and $v-v_{Bs}$ can then be recombined as described in the preceding paragraphs.

FIG. 14 illustrates the replacement of the low birefringent directional coupler (17) with a high birefringence polarisation selective directional coupler (19). FIG. 14 indicates a configuration utilising linearly birefringent fibre and fibre components but the use of circularly birefringent fibre and fibre components is equally feasible. The use of a polarisation selective coupler is analogous to a polarising beamsplitter and consequently recombination of the two orthogonal states takes place in the fibre coupler without the requirement of additional optical components.

Figure 15:
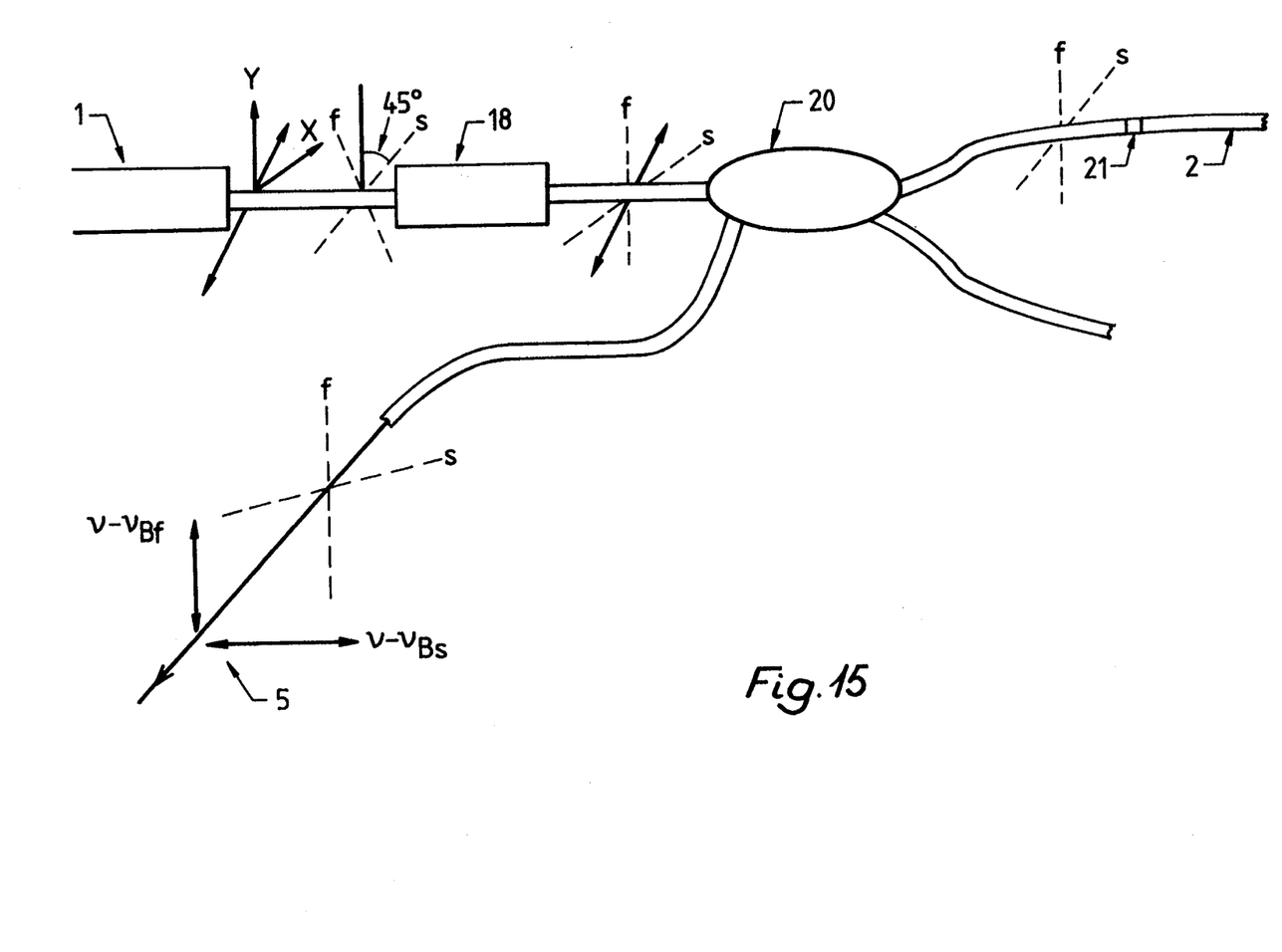

FIG. 15 illustrates the use of a directional coupler of the polarisation preserving type. The birefringent optical fibre in which SBS takes place (2) may possess linear or circular eigenmodes. In this configuration the two orthogonal states of polarisation remain orthogonal at the output of the fibre (5) but may be recombined using the techniques described previously (FIG. 8 and FIG. 9).

Figure 16:
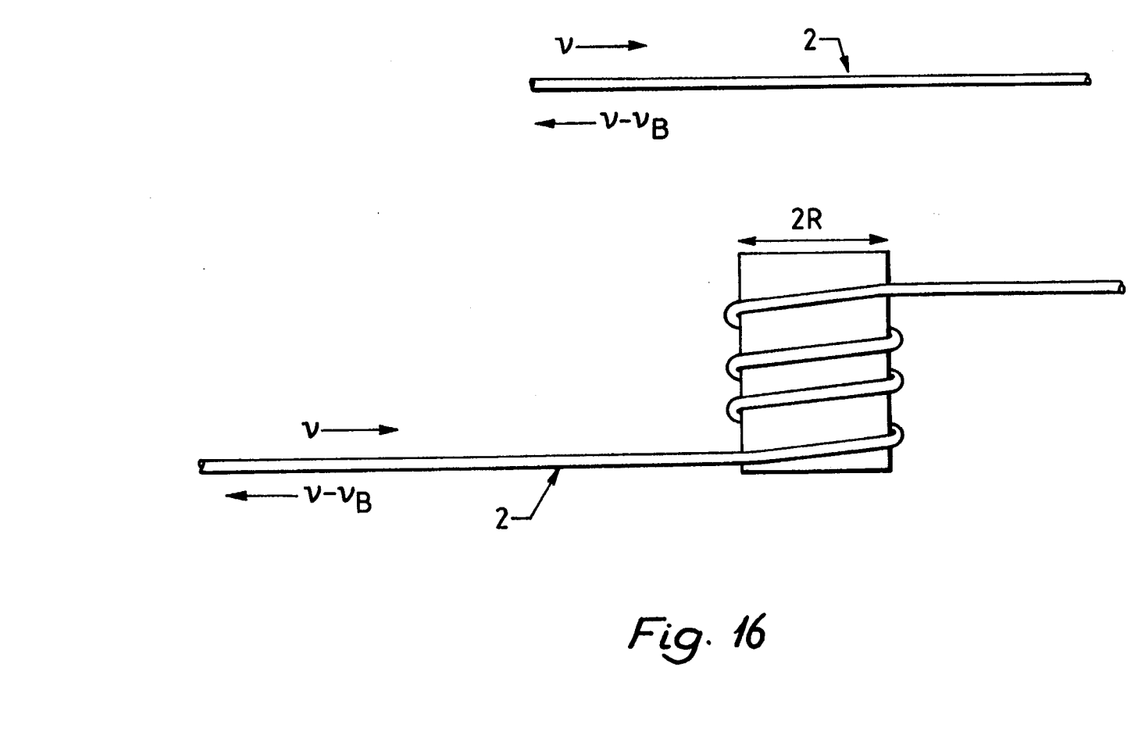
Figure 17:
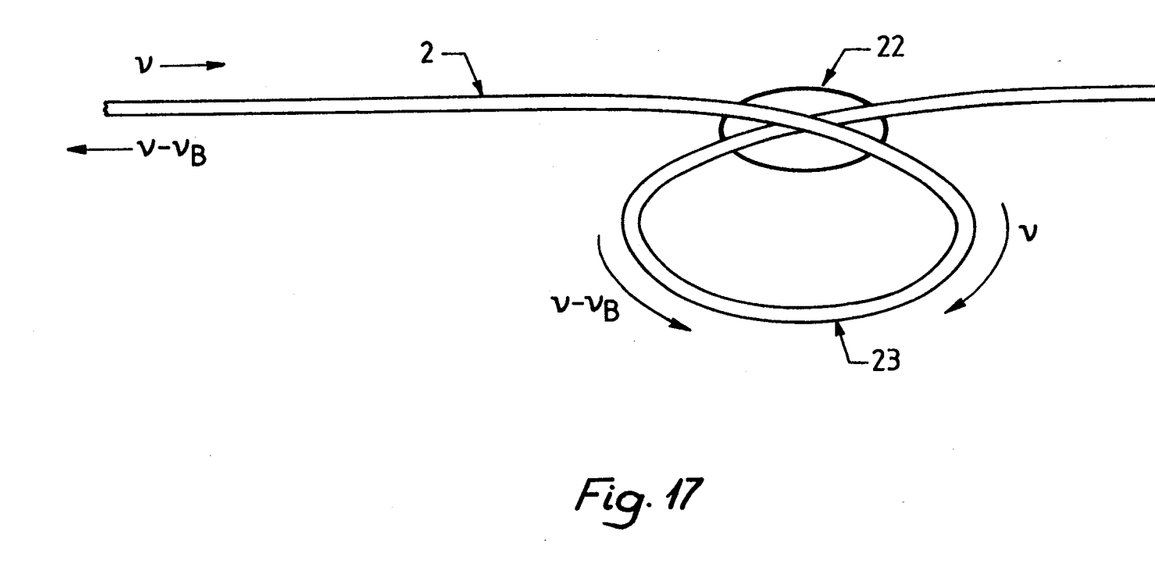

The birefringent optical fibre (2) in which the SBS takes place may be configured in the following ways: FIG. 16 indicates a length of fibre that may be either straight or deployed in the form of a coil of radius R. FIG. 17 indicates the fibre configured as a fibre optic ring resonator. Because of the multiple transitions of the optical beam around the optical fibre ring (23) of the resonator much shorter lengths of fibre or reduced laser power or a combination of both can be used to obtain SBS.

All of the configurations presented in the figures may be modified to produce hybrid systems of conventional and optical fibre components.

Since the magnitude of the refractive index of optical fibre is dependent on its physical environment, therefore the refractive index difference ($n_f - n_s$) and consequently the heterodyne carrier frequency is variable for example, by changing the temperature, pressure, strain, electric field, magnetic field applied to the fibre. The refractive index of the fibre is also dependent on the wavelength of the source and for some laser sources, for example solid state laser diodes, the wavelength is controllable giving rise to another mechanism by which control of the optical carrier frequency may be obtained.

We claim:

1. An arrangement for producing information indicative of signal frequency shifts using stimulated Brillouin scattering, said arrangement comprising:
    a laser producing a laser beam;
    optical fibre means, illuminated by the laser beam for generating two back-scattered signals by stimulated Brillouin scattering, said optical fibre means including a plurality of propagating modes, and
    means for combining said back-scattered signals to produce a beat frequency from the combined signals.

2. An arrangement for producing signal frequency shifts by stimulated Brillouin scattering according to claim 1 wherein said optical fibre means includes two fibres; wherein one of said optical fibres is subjected to a stimulus which produces a variation in said beat frequency.

3. An arrangement for producing signal frequency shifts by stimulated Brillouin scattering according to claim 2 characterised in that range gating means is provided to control select regions of said optical fibre means from which back-scattered signals are combined.

4. An arrangement for producing signal frequency shifts by stimulated Brillouin scattering according to claim 3 characterised in that signal processing means are provided to process the signal from said combining means.

5. An arrangement for producing signal frequency shifts by stimulated Brillouin scattering according to claim 3 characterised in that said signal processing means comprises an optical spectrum analyser.

6. An arrangement for producing signal frequency shifts by stimulated Brillouin scattering according to claim 3 characterised in that said signal processing means comprises a digital correlator.

7. An arrangement for producing signal frequency shifts by stimulated Brillouin scattering according to claim 2 characterised in that said optical fibre means comprises a pair of monomode fibres each coupled to a fibre optic ring resonator.

8. An arrangement for producing signal frequency shifts by stimulated Brillouin scattering according to claim 2 characterised in that said optical fibre means comprises a high birefringence optical fibre.

9. An arrangement for producing signal frequency shifts by stimulated Brillouin scattering according to claim 8 characterised in that the means for combining the orthogonally polarised signals comprises a polariser set with transmission axes substantially at ±45° to eigenaxis of the fibre.

10. An arrangement for producing signal frequency shifts by stimulated Brillouin scattering according to claim 9 characterised in that diode means are provided to convert the optical beat signal into an electrical signal.

11. An arrangement for producing signal frequency shifts by stimulated Brillouin scattering according to claim 8 further comprising beamsplitting means and focusing means, provided to substantially equally populate both eigenmodes of said high birefringence optical fibre.

12. An arrangement for producing signal frequency shifts by stimulated Brillouin scattering according to claim 8 characterised in that means are provided to compensate for unequal population of the eigenmodes of said high birefringence optical fibre.

13. An arrangement for producing signal frequency shifts by stimulated Brillouin scattering according to claim 8 characterised in that it includes a quarter wave plate orientated with its fast axis at 45° to the co-ordinate system.

14. An arrangement for producing signal frequency shifts by stimulated Brillouin scattering according to claim 8 characterised in that it includes Faraday isolater means (14) in the optical beam.

15. An arrangement for producing signal frequency shifts by stimulated Brillouin scattering according to claim 8 characterised in that it includes polarising beamsplitter means for recombination of the two orthogonal polarisation states output from the high birefringence optical fibre.

16. An arrangement for producing signal frequency shifts by stimulated Brillouin scattering according to claim 1 characterised in that it incorporates a laser diode having an optical fibre directly coupled thereto.

17. An arrangement for producing signal frequency shifts by stimulated Brillouin scattering according to claim 16 further comprising an optical fibre directional coupler for populating respective eigenmodes of the optical fibre.

18. An arrangement for producing signal frequency shifts by stimulated Brillouin scattering according to claim 16 further comprising an optical fibre directional coupler for populating respective eigenmodes of the optical fibre.

19. An arrangement for producing signal frequency shifts by stimulated Brillouin scattering according to claim 16 further comprising a high birefringence optical fibre directional coupler for populating respective eigenmodes of the optical fibre.

20. A measuring instrument sensitive to variations in an external ambient condition which produces signal frequency shifts using stimulated Brillouin scattering said instrument comprising:
    a laser producing a laser beam;
    optical fibre means, illuminated by the laser beam for generating two back-scattered signals by stimulated Brillouin scattering, said optical fibre means including a plurality of propagating modes, and
    means for combining said back-scattered signals to produce a beat frequency from the combined signals, and producing said signal frequency shifts from said beat frequency.

21. An arrangement as in any of the preceding claims, further comprising means for generating a variable frequency electrical signal indicative of signal frequency shifts from said beat frequency.

* * * * *